June 13, 1961 HIROSHI YAMADA 2,988,277

BORROWING CIRCUIT OF A BINARY SUBTRACTIVE CIRCUIT AND ADDER

Filed May 28. 1956 5 Sheets-Sheet 1

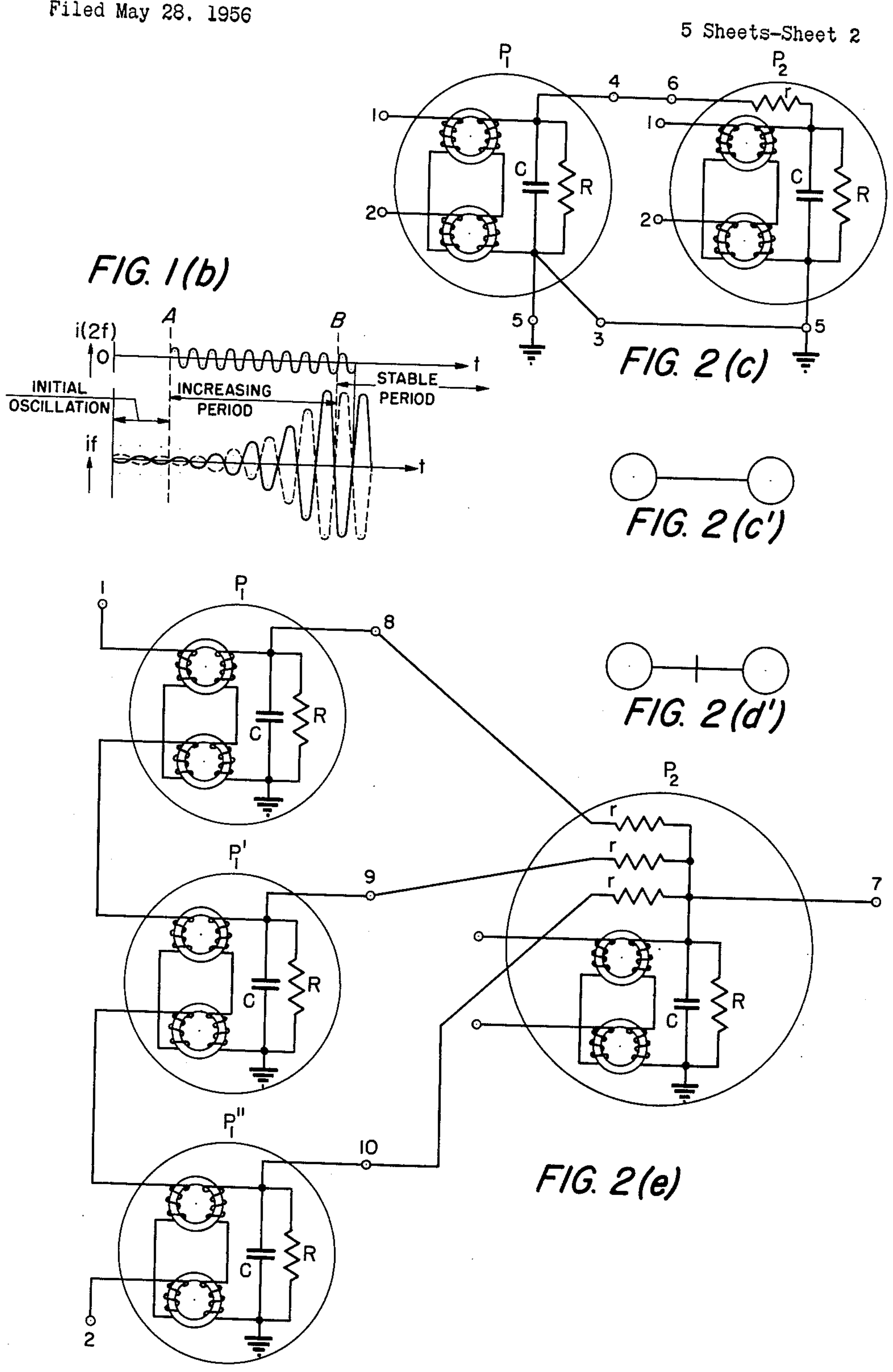
FIG. 1(b), FIG. 2(c), FIG. 2(c'), FIG. 2(d'), FIG. 2(e)

BORROWING CIRCUIT OF A BINARY SUBTRACTIVE CIRCUIT AND ADDER

Filed May 28, 1956 5 Sheets-Sheet 5

United States Patent Office 2,988,277

Patented June 13, 1961

2,988,277

BORROWING CIRCUIT OF A BINARY SUBTRACTIVE CIRCUIT AND ADDER

Hiroshi Yamada, Ota-ku, Tokyo-to, Japan, assignor to Kokusai Denshin Denwa Kabushiki Kaisha, Chiyoda-ku, Tokyo-to, Japan Filed May 28, 1956, Ser. No. 587,619
Claims priority, application Japan June 2, 1955
9 Claims. (Cl. 235—175)

This invention relates to an electric borrowing circuit of a binary subtractive circuit and adder which utilizes so-called parametrically excited resonators, the principle and operation of which is described hereinafter.

The phenomena, in which oscillation of a resonator or electric resonance circuit is parametrically excited, means that when the resonance frequency of a resonator is subjected to a variation by exciting the resonator with a current having a frequency $2f$ which is equal to about twice the resonance frequency, a ½ subharmonic oscillation having a frequency $f$ is induced in the resonator (cf. N. W. McLachlan: Ordinary Non-Linear Differential Equations, Oxford 1950, Chapter VII, Equations Having Periodic Coefficient, at page 119). Hereinafter, such a parametrically excited resonator as described above will be denoted as a parametron. In general, parametric oscillation of a parametron having a frequency $f$ has a remarkable character in that it can oscillate at only two different phases which differ about 180° from each other, one and the other of said oscillations being denoted, respectively, as 0 radian oscillation and $\pi$ radian oscillation. It is possible to indicate one binary digit according to whether the parametron is carrying out a 0 radian oscillation or a $\pi$ radian oscillation.

The fact whether the parametric oscillation becomes a 0 radian oscillation or a $\pi$ radian oscillation will be determined according to the phase of a weak signal current having a frequency $f$ and applied to the resonance circuit of the parametron. The weak signal current is applied just prior to application of the exciting current to the parametron. Accordingly, it is possible to amplify the signal current having a frequency $f$ and carrying a binary signal in the form of a phase difference of 180° while precisely preserving the binary signal.

In electric subtractive circuits heretofore in use, which are composed of a plurality of vacuum tubes and diodes and in which the value of each figure or digit of a binary member is determined by existence of an impulse wave corresponding to each digit of a binary member, for the purpose of obtaining subtraction $(X_0-Y_0)$ between two binary numbers $X_0$ and $Y_0$, necessitate very complex operation because counting $X_0+\overline{Y}_0=X_0-Y_0$ must be carried out after obtaining the complement $\overline{Y}_0$ of the binary number $Y_0$.

An important object of this invention is to provide a very simple electric borrowing circuit of a binary subtractive circuit and adder combination, said circuit being free of the disadvantages such as described above and being capable of carrying out simply and speedily the borrowing operation of an electric binary circuit.

The novel features of this invention are set forth with particularity in the appended claims. This invention, however, both as to its construction and operation, together with further objects and advantages thereof, may best be understood by reference to the following description, taken in connection with the accompanying drawings, in which:

FIG. 1(*a*) is a connection diagram of one embodiment of the parametron which is to be utilized in this invention as the circuit element.

FIG. 1(*b*) is a wave form diagram showing the principle of operation of the resonator according to the present invention.

FIGS. 2(*c*), (*d*) and (*e*) are views of three kinds of connection circuits of the parametrons.

FIGS. 2(*c'*), 2(*d'*) and FIG. 2(*a*) are, respectively, schematic symbolic views of the circuits in FIGS. 2(*c*), 2(*d*) and 2(*e*).

FIG. 2(*b*) corresponds to FIG. 2(*d'*), in which the parametrons are omitted.

FIG. 3(*a*) shows wave forms of the exciting currents to be supplied to the delay circuit shown in FIGS. 3(*b*), 3(*c*) and 3(*d*). FIGS. 3(*b*), 3(*c*) and 3(*d*) are symbolic views of the "Delay" circuit, according to the invention.

FIGS. 4(*a*) and 4(*b*) are schematic symbol diagrams for describing the principal operation of this invention.

Figure 1A:
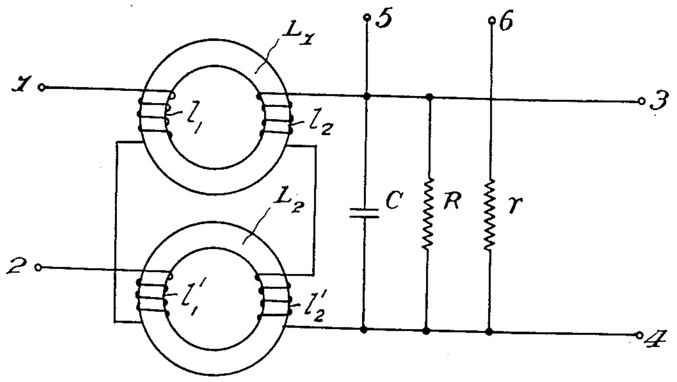

Referring to FIG. 1(*a*), $L_1$ and $L_2$ show a nonlinear reactor the cores of which are, for example, laminated cores, ferrite cores, or oxide cores. The coils $l_1$, $l_1'$, $l_2$ and $l_2'$ are wound as shown in the drawing. $l_2$ and $l_2'$ are in phase and $l_1$ and $l_1'$ are in counter phase. $l_2$, $l_2'$ and the capacitor C constitute a resonant circuit having the resonance frequency $f$. To the terminals 1 and 2 of the exciting coils $l_1$ and $l_1'$ are connected in series the exciting current source having the frequency $2f$, and the direct current source which operates the cores $L_1$ and $L_2$ at the maximum variation point of permeability $u$ of the cores magnetization character. In case the exciting current having the frequency $2f$ is supplied to the coils $l_1$ and $l_1'$, the resonant circuit $l_2$–$l_2'$–C oscillates at the frequency $f$ (½ subharmonic of the exciting frequency). Although the above resonant circuit may oscillate at a subharmonic other than ½ subharmonic, the oscillation most easily occurs at ½ subharmonic and, therefore, the following description is made only for the latter case. The mode of oscillation of ½ subharmonic is as shown in FIG. 1(*b*). The initial oscillation current $i(f)$ of low intensity, having frequency $f$, existing in the resonant circuit, is built up, when the "parametron" is excited with an exciting current $i(2f)$ of frequency $2f$ at the time point A in FIG. 1(*b*). Then, the amplitude rapidly increases to a certain limited intensity, at the time point B, and thereafter the oscillation is sustained with stability. The phase of the above oscillation cannot be other than either one of the phases, counter to each other, as shown with a solid line and with a broken line in FIG. 1(*b*). Once such an oscillation state is established, the oscillation continues with a high stability as long as the exciting voltage is applied, and it stops when the supply of the exciting current is cut off. However, when the exciting circuit is again closed and the exciting current having the frequency $2f$ is impressed, the resonant circuit oscillates again with a frequency $f$, as described above. Whether the phase of oscillation in this case is as shown in a solid line or in a broken line in FIG. 1(*b*) depends upon the initial conditions of excitation.

In order to have the above oscillation phase determined, a phase control current having the frequency $f$ is impressed during the non-excitation period, on the resonant circuit $l_2$–$l_2'$–C through a resistance $r$ at the terminals 5 and 6, as shown in FIG. 1(*a*).

The oscillation of the frequency $f$ impressed on the resonant circuit is amplified during the period A to B and the oscillation state is brought about as above-mentioned. Therefore, the oscillation phase in this case is definite, and the phase is always determined by the relation between the phase of oscillation applied to the resonant circuit and the phase of the exciting oscillation. It is always possible, therefore, to take out the oscillation output with frequency $f$, of the definite phase, from the output terminals 3 and 4.

Similarly, when the control signal current having a counter phase is impressed on the resonant circuit $l_2$–$l_2'$–C by means of a transformer or a proper circuit which brings about the counter phase, the oscillation having a counter phase to that of the oscillation afore-mentioned is produced, and the oscillation output in counter phase to that afore-mentioned is taken out. Supposing the phase of the afore-mentioned case is as shown in a solid line, the phase of the present case is as shown in a broken line in FIG. 1(*b*).

Once the oscillation is produced, the initial mode of oscillation (frequency, phase and amplitude) continues with a high stability as long as $S_1$ the exciting circuit is closed and the exciting voltage is applied, no matter whether the control current is cut off from the resonant circuit, whether the control current having a phase or counter phase is connected, to the resonant circuit and whether an alternating voltage of the frequency different from $2f$ is super-imposed on the exciting current. The operation of controlling the phase of the oscillation wave by the phase of a weak control current can be compared to the operating conditions of a thyratron in case the anode voltage is interrupted and, the grid voltage is varied, whereby the operating conditions are varied. (This corresponds, in the present case, to the interruption of the exciting voltage, the variation of the phase of the phase control voltage impressed on the resonant circuit, and the variation of the oscillation state.)

The above description is made as to the case where the ferro-magnetic material is used as a nonlinear element which constitutes the resonant circuit.

As is clear from the above description, the above-mentioned resonator can perform the amplification of the oscillation voltage and the limiting action of the oscillation amplitude, because the exciting voltage with frequency $2f$ is impressed on the resonant circuit whereby the initial oscillation with low intensity with frequency $f$ is rapidly amplified to a certain intensity which is continued with stability. Since the oscillation phase is either $\delta$ or $\delta+\pi$ by the "pull in" phenomenon of the phase, and said oscillation phase is maintained during the excitation period, it is possible to make the phase discrimination, and to memorize the signal in the form of phase, whereby the resonator is suited for use as a "logical element." The resistance R is used to damp rapidly the oscillation upon cease of the application of the exciting current. The resistance $r$ is a coupling resistance for the application of a control wave having a suitable coupling coefficient. Accordingly, when several kinds of control waves are applied in parallel to the resonant circuit of the parametron through a respective coupling resistance, the phase of the oscillation wave will be determined by the phase of the resultant of said control waves.

Figure 2:
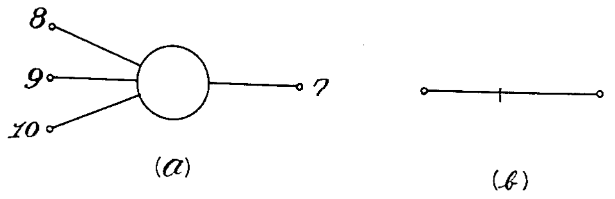

FIG. 2(*c*) concerns signal transmission by coupling two "parametrons" $P_1$ and $P_2$. In FIG. 2(*c*), the "parametron circuit" of FIG. 1(*a*) is shown by $P_1$ and $P_2$. The left side "parametron" $P_1$ is supposed to be in the oscillation state by the exciting current having the frequency $2f$ being applied to the exciting terminals 1 and 2. The oscillation voltage having a frequency $f$ of the resonant circuit of the parametron $P_1$ is impressed on the resonant circuit of the parametron $P_2$ through the respective coupling element, namely, the coupling impedance $r$. Then the phase of the voltage impressed on the resonant circuit of the parametron $P_2$ is in phase with that of the oscillation voltage of $P_1$ (the frequency of the two is $f$). When the exciting voltage having the frequency $2f$ is impressed on terminals the oscillation voltage impressed on the resonant circuit of the parametron $P_2$ 1 and 2 of the parametron $P_2'$, rapidly increases, and $P_2$ oscillates in phase with $P_1$ with the frequency $f$. Namely, the oscillation state (signal) of $P_1$ is transmitted to $P_2$. Then, even when the exciting voltage of $P_1$ is cut off and the oscillation of $P_1$ is stopped, $P_2$ continues its oscillation, as long as the exciting voltage is impressed on $P_2$, and therefore, the signal of $P_1$ is completely transferred to $P_2$. The circuit in FIG. 2(*d*) is the same as the circuit in FIG. 2(*c*) except that in the former a phase inverting transformer T is connected between both the parametrons $P_1$ and $P_2$.

Figures 5, 6, 7:
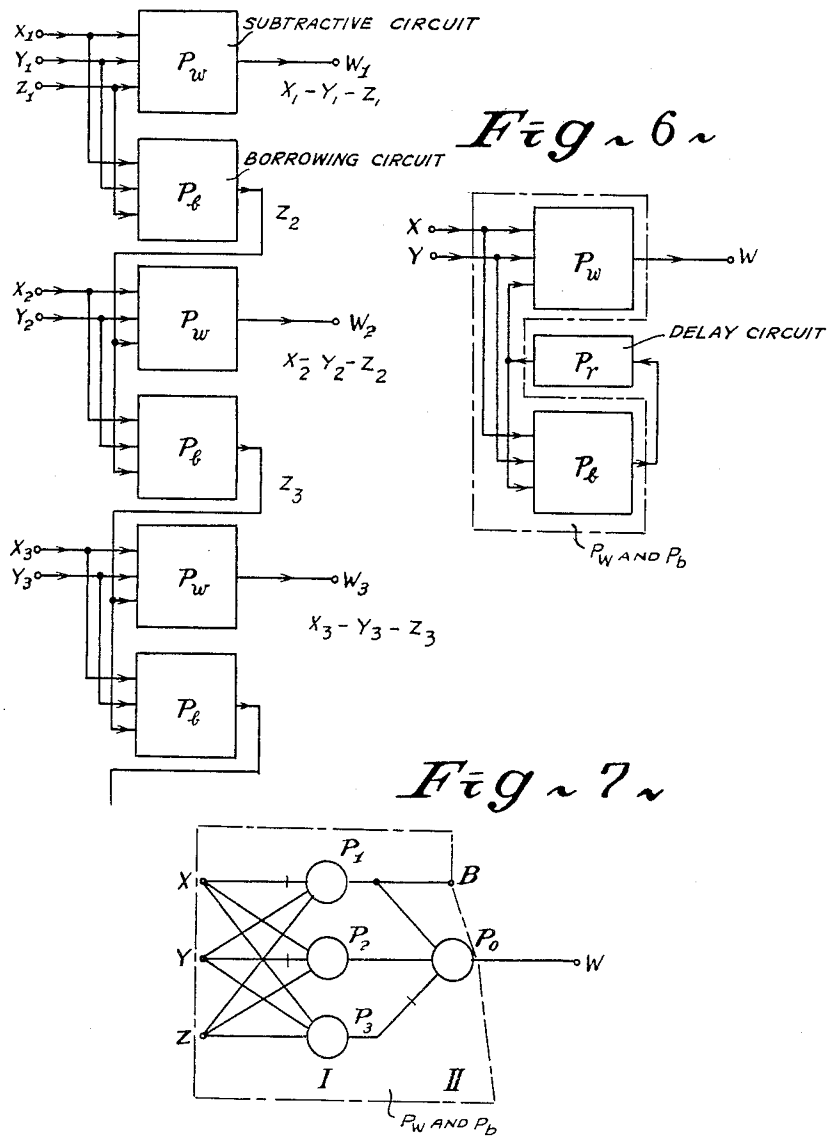
FIG. 5 is a schematic connection diagram of one application of an embodiment of this invention.
FIG. 6 is a schematic connection diagram of another embodiment of this invention.
FIG. 7 is a schematic symbol connection diagram of the circuit according to this invention which composes a part of an additive and subtractive circuit.
Figure 8:
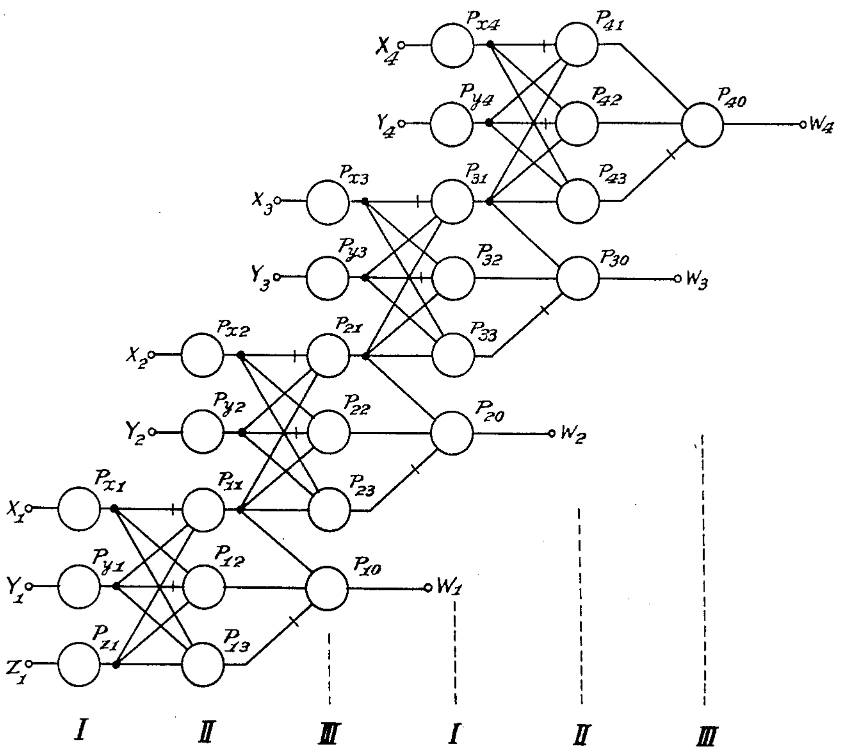
FIG. 8 is a schematic symbol connection diagram of another embodiment of this invention.
Figure 9:
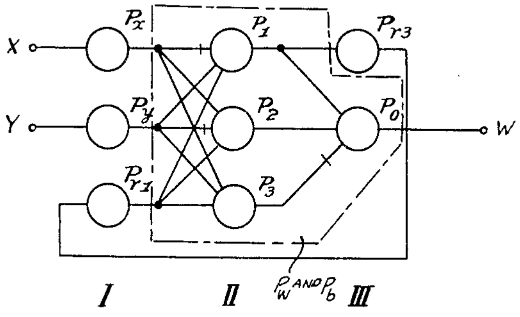
FIG. 9 is a schematic symbol connection diagram of a still further embodiment of this invention.

The circuits in FIGS. 2(*c*) and 2(*d*) are, respectively, indicated in the illustrations in FIGS. 7, 8 and 9 by the simple, schematic symbols such as shown in FIGS. 2(*c'*) and 2(*d'*). That is to say, the parametron and the phase inverting transformer is indicated, respectively, by a circle and short cross line.

The circuit in FIG. 2(*c*) relates to the case in which one parametron is controlled by the other parametron, but when one parametron $P_2$ is to be controlled by three parametrons $P_1$, $P_1'$ and $P_1''$, the parametrons are connected as shown in FIG. 2(*e*). The operation of the circuit in FIG. 2(*e*) is entirely the same as that in the circuit in FIG. 2(*c*) except in that in the former circuit, the parametron $P_2$ is controlled by three kinds of control voltages from the parametrons $P_1$, $P_1'$ and $P_1''$. The circuit in FIG. 2(*e*) (in case the left side three control parametrons are omitted) is indicated in the illustrations in FIGS. 7, 8 and 9 by the simple, schematic symbols such as shown in FIG. 2(*a*).

Figure 3A:
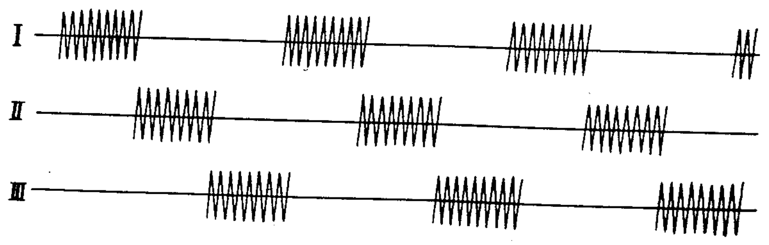
Figures 3B, 3C, 3D:
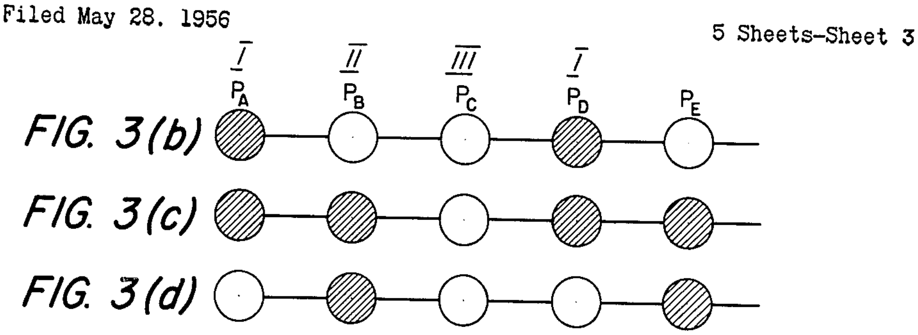

FIGS. 3(*b*), 3(*c*) and 3(*d*) show an example of the "Delay" circuit, in which the "parametron" circuit of FIG. 1(*a*) is represented as $P_A$, $P_B$, $P_C$ . . . , and such "parametrons" are coupled together successively as shown, "parametrons" in every third place, namely $P_A$, $P_D$ . . . , $P_B$, $P_E$ . . . and $P_C$, $P_F$ . . . , are taken as groups, and each group is made to oscillate or made to cease to oscillate simultaneously. Let it be assumed that only the "parametrons" $P_A$, $P_D$ . . . (group I), shown hatched are excited, that these are respectively in the state or condition "0" or state "1," and that also these memorize "logical variables," $x$, $y$ . . . , which take the value "0" or "1" in the form of an oscillation phase. In order to use easily logical algebra, the phase of oscillation of a certain "parametron" is taken as standard, and the "parametrons" oscillating in phase with the former standard "parametrons" are assumed to "be in the state of '1'" or to "be memorizing '1'." The "parametrons" oscillating in counter phase are assumed to be in the state of "0" or to be memorizing "0." It is to be noted that, differently from relays and tubes, the state "1" or "0" of parametron is distinguished by the phase of oscillation, and irrespective of the state "1" or "0," the amplitude of oscillation is unchanged. In this case, a part of the oscillation voltage of group I is transferred in the two senses to each "parametron" in the groups II and III ($P_B$, $P_E$ . . . , and $P_C$, $P_F$ . . .) adjoining the group I and each parametron in the groups II and III oscillate with a small amplitude. This state is shown in FIG. 3(*b*).

Then, when the "parametrons" in the group II are excited, the oscillation with a small amplitude of the group II is amplified under an efficient coupling, and the state of such amplified oscillation is sustained with stability in phase with "parametrons" of the group I. This is shown in FIG. 3(*c*). Then, when the excitation of the "parametrons" of the group I is interrupted, the state becomes as shown in FIG. 3(*d*). It is seen that FIG. 3(*d*) corresponds to FIGS. 3(*b*), but in which the state of the "parametrons" is moved to the right side by one. By repeating similar operations, the "logical variables," $x$, $y$ . . . , can be shifted successively to the right side, and a kind of shift registers can be obtained thereby. The above shifting of the state by alternately interrupting the excitation of "parametrons" of the three groups may be compared to the stepping of a "Dekatron." By applying a "logical variable" $x$ ("1" or "0") to a point of such a circuit, and by repeating the above operations, $x$ shifts successively to the right side, and the delayed $x$ can be taken out from a desired point, and therefore, such a circuit can be used as "Delay" circuit. "Parametrons" coupled with the oscillating "parametrons" are brought to the oscillation state in phase with the oscillating "parametrons" irrespective of their coupling sense. In the above "Delay" circuit, every third "parametron" was taken as a group for simultaneous excitation and the groups I, II and III were made to excite successively, for the purpose of limiting the shifting sense of the "logical variables" to one side only, the exciting waves which are necessary for successively exciting said groups I, II and III are shown in FIG. 3($a$), said exciting waves being slightly overlapped in time with one another. The oscillation outputs of the parametrons which are applied with the exciting wave I control the phase of the oscillation outputs of the parametrons which are applied with the exciting wave II so as to restrict said phases to either one of 0 radian and $\pi$ radian.

In the same manner as above, the outputs of the parametron elements which are excited with the exciting wave II can control the phases of the oscillation outputs of the parametron elements which are excited with the exciting wave III and the outputs of the parametron elements which are excited with the exciting wave III can control the phases of the oscillation outputs of the parametron elements which are excited with the exciting wave I. In FIGS. 7, 8 and 9, the numerals I, II and III indicated under the elements denote the elements which are excited with the respective exciting wave I, II or III.

Figure 4B:
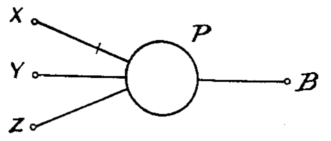
Figures 2D, 4A:
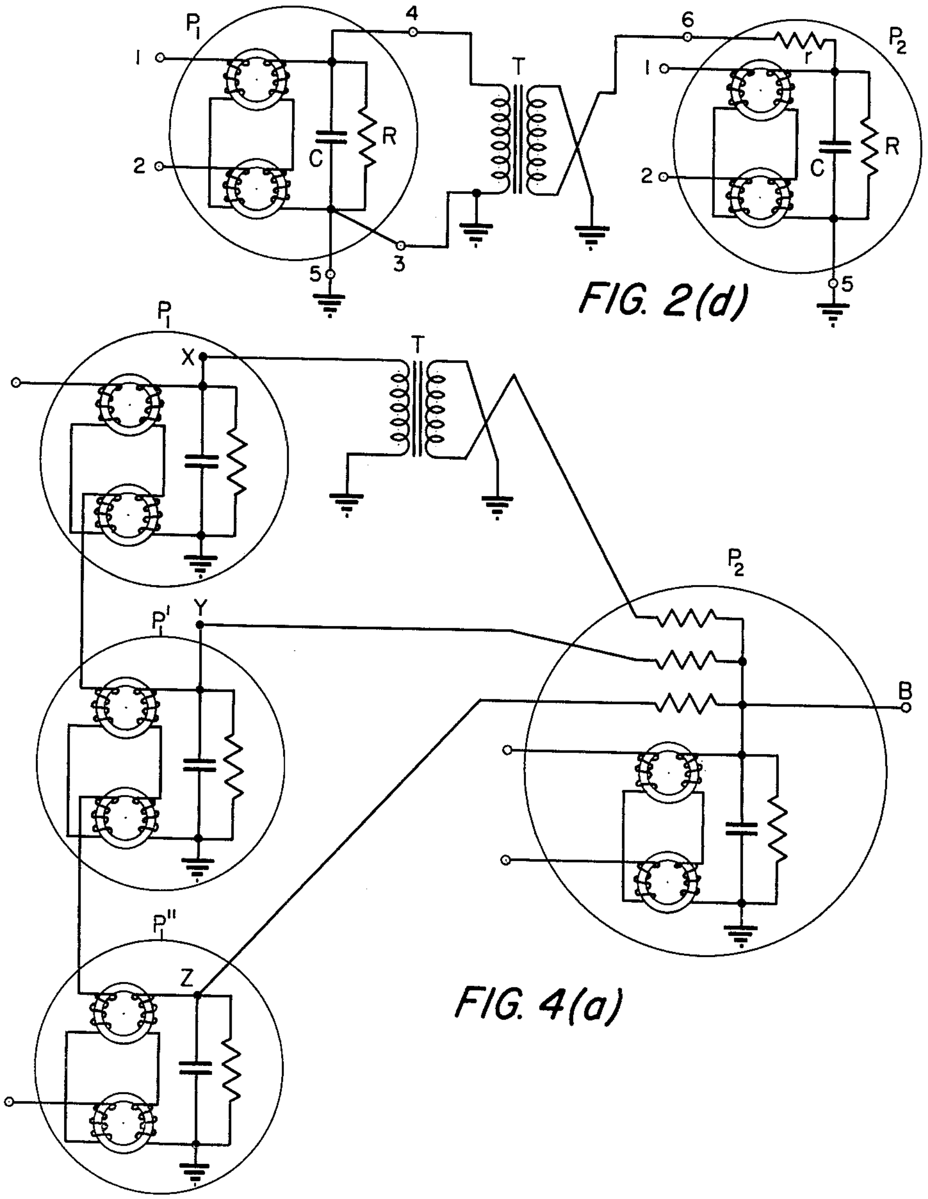

FIG. 4($a$) is a schematic view for describing the principle of this invention said figure being almost the same as that in FIG. 2($e$), except that in the former, a phase inverting transformer T is inserted between the parametrons $P_1$ and $P_2$ and said figure (excluding the left side parametrons) is indicated in FIG. 4($b$) by a simple, schematic symbol.

In FIG. 4, a parametron element $p$ is provided with three pairs of input terminals X, Y and Z, each pair of the terminals being impressed with a respective input signal having the same frequency as the resonance frequency of the parametron element. The amplitudes of the three input signal waves are almost equal, and each phase of the input signal waves takes 0 radian or $\pi$ radian in accordance whether it represents "0" or "1" of the binary digit. When the parametron element is excited with exciting waves, the phase of its oscillation wave will be determined as 0 radian or $\pi$ radian by the resultant phase of the three signal waves. Accordingly, it is possible to obtain an output signal corresponding to "0" or "1" of the system of binary digit rotation at the output terminal B.

Let it be assumed that three binary digits representing the signal waves applied to the terminals X, Y and Z are, respectively, represented by $x$, $y$ and $z$ and a binary digit corresponding to the output signal to be sent out from the output terminal B is represented by $b$, then the binary digit $b$ to be obtained by various combinations of the binary digits $x$, $y$ and $z$ will become as follows.

| | | | | | | | | |
|---|---|---|---|---|---|---|---|---|
| $x$ | 1 | 1 | 1 | 1 | 0 | 0 | 0 | 0 |
| $y$ | 1 | 1 | 0 | 0 | 1 | 1 | 0 | 0 |
| $z$ | 1 | 0 | 1 | 0 | 1 | 0 | 1 | 0 |
| $b$ | 1 | 0 | 0 | 0 | 1 | 1 | 1 | 0 |

The binary digit $b$ corresponding to output signal is logically represented by the following Formula 1, in case of subtraction ($x-y-z$).

$$b=(x\wedge y\wedge z)\vee(\bar{x}\wedge y\wedge z)\vee(\bar{x}\wedge y\wedge \bar{z})\vee(\bar{x}\wedge \bar{y}\wedge z) \qquad (1)$$

The value $b$ in the above table satisfies completely said logical formula.

That is to say, it is possible to obtain the value to be borrowed in carrying out subtraction ($x-y-z$) between three binary digits $x$, $y$ and $z$ by means of the parametron circuit such as shown in FIG. 4.

In FIGS. 5, 6 and 7 are shown the circuits capable of carrying out subtraction ($X_0-Y_0$) between two binary numbers $X_0$ and $Y_0$ by utilizing the borrowing circuit $P_b$ as described above.

In FIG. 5 are shown subtractive circuits connected in parallel, in which three pairs of input terminals ($X_1$, $Y_1$), ($X_2$, $Y_2$) and ($X_3$, $Y_3$) have applied thereto two kinds of input signals representative of the numbers $X_0$ and $Y_0$, successively, at a time lag corresponding to the operation period of time of the borrowing circuit $P_b$. Each of the pairs of terminals being, respectively, representative of the digits and each of the signals corresponding to a respective one of the digits; and a terminal $Z_1$ of the circuit corresponding to the lowest order of the digits to which is always applied a binary digital signal "0." The circuits $P_w$ are additive and subtractive circuits for the addition of three binary digits $x$, $y$ and $z$. These circuits send out the signals corresponding to the value W which is represented by the following Formula 2, from their output terminals $W_1$, $W_2$ and $W_3$.

$$W=(x\wedge y\wedge z)\vee(\bar{x}\wedge y\wedge \bar{z})\vee(\bar{x}\wedge \bar{y}\wedge z)\vee(x\wedge \bar{y}\wedge \bar{z}) \qquad (2)$$

That is to say, at the output terminal $W_1$ of the circuit belonging to the first digit or lowest order will be obtained the signal corresponding to the binary digit of the lower order of the subtracted binary value ($x_1-y_1$) between the binary digits $x_1$ and $y_1$ in the first order of the binary numbers $X_0$ and $Y_0$. At the same time the signal corresponding to the binary digit $b_2$ to be borrowed from the higher order is obtained by the borrowing circuit $P_b$ and the binary digit thus obtained is added to one of the input terminals belonging to the second digital order. Accordingly, at the output terminals of the subtractive circuit belonging to the second order or position is obtained the signal corresponding to the binary digit of the lower order or position of the subtracted binary value ($x_2-y_2-b_2$) between the binary digits $x_2$, $y_2$ and $b_2$ of the second order of the binary numbers $X_0$ and $Y_0$. At the same time the signal corresponding to the binary digit to be borrowed from the higher order is obtained by the borrowing circuit $P_b$ belonging to the second order and the signal thus obtained is added to one of the input terminals belonging to the third order.

In such a manner as described above, it is possible to obtain successively the binary value of each digit or order in the subtracted binary value ($X_0-Y_0$) between the binary numbers $X_0$ and $Y_0$ from the output terminals $W_1$, $W_2$ and $W_3$.

In FIG. 6 is shown one embodiment of a subtractive circuit of a serial type which utilizes only one additive and subtractive circuit $P_w$ and one borrowing circuit $P_b$. In the circuit in FIG. 6, the signals corresponding to binary digits in the order of the binary number $X_0$ are, respectively, applied to the input terminal X, in successive order of the first, second etc. digital orders at a respective time lag which is, for example, equal to one modulation cycle of the parametron exciting wave. Similarly, the signals corresponding to binary digits in the positions of the binary number $Y_0$ are, respectively, applied to the input terminal Y, in successive order of the first, second etc. orders at the same respective time lag as described above.

On the other hand, the output signal of the borrowing circuit $P_b$ is fed back to one of the input terminals of the additive and subtractive circuit $P_w$ and to one of the input terminals of the borrowing circuit $P_b$, through a delay circuit $P_r$ capable of giving a time lag corresponding to ⅔ of one modulation cycle of the parametron exciting wave. Accordingly, from the output terminal W is first sent out the signal corresponding to the binary digit in a lower order of the subtracted binary value ($x_1-y_1$) between the first orders of the binary numbers $X_0$ and $Y_0$.

After a time lag corresponding to one modulation cycle of the parametron exciting wave, the signal corresponding to the binary digit $b_2$ to be borrowed from the higher order is applied from the borrowing circuit $P_b$ to the input terminal of the circuit $P_w$ together with the signals corresponding to the binary digits $x_2$ and $y_2$ of the second figure or order, so that the signal corresponding to the subtracted binary value $(x_2-y_2-b_2)$ is sent out from the output terminal W.

In such a manner as described above, it is possible to obtain, in successive order at a respective time lag corresponding to one modulation cycle of the parametron exciting wave, the binary value of each order of the subtracted binary value $(X_0-Y_0)$ between two binary numbers $X_0$ and $Y_0$ from the output terminal W.

In the embodiment of this invention, it is, of course, preferable to arrange separately the above-mentioned additive and subtractive circuit $P_w$ and subtractive borrowing circuit $P_b$, but it may be allowable to use a part of the former circuit as the latter circuit.

In FIG. 7 is shown another embodiment of this invention, in which a part of the additive and subtractive circuit is used in common as the borrowing circuit. In this embodiment, when signals corresponding to three binary digits $x$, $y$ and $z$ are applied to the input terminals X, Y and Z, the parametron elements $P_1$, $P_2$ and $P_3$ are oscillated by the exciting wave I shown in FIG. 3, and the output parametron element $P_0$ is oscillated by the exciting wave II shown in FIG. 3, the parametron element $P_1$ which is excited with the signals corresponding to a complement of the binary digit $x$ and to binary digits $z$ and $y$ sends out a signal corresponding to the binary digit to be borrowed. This signal can be taken out from the terminal B in the same manner as heretofore described. The output signal W of the output parametron element $P_0$ are given by the following table in accordance with the combination of the input binary digits $x$, $y$ and $z$, said signals satisfying the above-mentioned logical Formula 2 and being used as the additive and subtractive values of three binary digits $x$, $y$ and $z$.

| | | | | | | | | |
|---|---|---|---|---|---|---|---|---|
| x | 1 | 1 | 1 | 1 | 0 | 0 | 0 | 0 |
| y | 1 | 1 | 0 | 0 | 1 | 1 | 0 | 0 |
| z | 1 | 0 | 1 | 0 | 1 | 0 | 1 | 0 |
| Output signals of $P_1$ | 1 | 0 | 0 | 0 | 1 | 1 | 1 | 0 |
| Output signals of $P_2$ | 1 | 0 | 1 | 1 | 0 | 0 | 1 | 0 |
| Output signals of $P_3$ | 1 | 1 | 1 | 0 | 1 | 0 | 0 | 0 |
| W | 1 | 0 | 0 | 1 | 0 | 1 | 1 | 0 |

In FIGS. 8 and 9 are shown particular embodiments of this invention, in which each circuit which carries out the subtraction $(X_0-Y_0)$ between two binary numbers $X_0$ and $Y_0$ is composed of the circuit illustrated in FIG. 7. The circuit in FIG. 8 is a parallel subtractive circuit corresponding to a binary number of four figures or orders and corresponding to the circuit in FIG. 5. The circuit in FIG. 9 is a serial subtractive circuit corresponding to the circuit in FIG. 6. That is to say, in FIG. 8, to the input terminals $(X_1, Y_1)$, $(X_2, Y_2)$, $(X_3, Y_3)$ and $(X_4, Y_4)$ are, impressed respectively, with the signals corresponding to binary values of the first, second, third and fourth order of two binary numbers $X_0$ and $Y_0$ in successive order at a respective time lag corresponding to ⅓ of one modulation cycle of the parametron exciting wave. The input signals are converted to the control signals having a definite amplitude and capable of being oscillated at a definite time by means of the input parametron elements $P_{x1}$, $P_{y1}$, $P_{x2}$, $P_{y2}$ . . . and then applied to the parametron elements $P_{11}$, $P_{12}$, $P_{13}$, $P_{21}$, $P_{22}$ . . . which correspond to the elements $P_1$, $P_2$ and $P_3$ in the circuit in FIG. 7. On the other hand, a binary digital signal representative of the condition "0" is always applied to the input terminal $Z_1$ belonging to the first digital order and the parametron elements $P_{11}$, $P_{21}$, $P_{31}$ corresponding to the parametron element $P_1$ in the circuit in FIG. 7 compose the borrowing circuit, so that by means of applying successively said signals to the parametron elements $(P_{21}, P_{22}, P_{23})$, $(P_{31}, P_{32}, P_{33})$ and $(P_{41}, P_{42}, P_{43})$ belonging to higher digital orders together with the signal in the higher order or position, it is possible to take out the signal corresponding to the binary value of each digital order of the subtracted binary value $(X_0-Y_0)$ between the binary numbers $X_0$ and $Y_0$ from each of the output terminals $W_1$, $W_2$, $W_3$ and $W_4$ belonging to the first, second, third and fourth digital order, in successive order at a respective time lag corresponding to ⅓ of one modulation cycle of the parametron exciting wave.

In the circuit in FIG. 9, when the signals corresponding to binary values in digital orders of the binary numbers $X_0$ and $Y_0$, have a respective time lag corresponding to one modulation cycle of the parametron exciting wave and are, respectively, applied to the input terminals X and Y and the output signal of the parametron element $P_1$ composing the borrowing circuit is fed back to the input terminals of the parametron elements $P_1$, $P_2$ and $P_3$ after synchronizing the last-mentioned output signal with the input signals of the input terminals X and Y by delaying said output signal by ⅔ of one modulation cycle of the parametron exciting wave through the parametron elements $P_{r3}$ and $P_{r1}$, it is possible to take out successively the signals corresponding to the binary values in the orders of the subtracted binary value $(X_0-Y_0)$ from the output terminal W. These last-mentioned signals have a respective time lag corresponding to one modulation cycle of the parametron exciting wave.

According to this invention, as described above, the parametron or parametrons are impressed with three kinds of control signals having almost the same amplitude and corresponding respectively to the complement of a binary number $x$ and to binary numbers $y$ and $z$, each of said signals having a 0 radian or $\pi$ radian phase in accordance with conditions "0" or "1." The borrowing value of the subtraction $(x-y-z)$ is obtained by controlling the oscillation phase of the parametron or parametrons by means of the resultant wave of said three signals on a majority principle.

Accordingly, subtraction of binary numbers will very simply be carried out and also the construction of the apparatus becomes very simple, because it is possible to make the borrowing circuit as one part of the additive and subtractive circuit.

While particular embodiments of this invention have been described and shown, it will, of course, be understood that it is not to be limited thereto, since many modifications may be made of this invention, therefore, it is contemplated by the appended claims to cover all such modifications as fall within the true spirit and scope of this invention.

What I claim is:

1. In a computing apparatus for performing mathematical operations expressed in the binary system of notation, in combination, a plurality of stages of parametrically excited resonators, each stage comprising an adding-subtracting circuit and a borrowing circuit, the adding-subtracting and borrowing circuits each comprising at least one output resonant circuit having a predetermined resonance frequency, at least one exciting circuit coupled to said resonant circuit for parametrically exciting said resonant circuit means comprising at least one non-linear element for coupling said exciting and output resonant circuits, means for impressing on each of said exciting circuits a frequency of substantially twice said resonance frequency, means receptive of three control signals of substantially equal intensity, said last mentioned means being connected to apply said control signals to said resonant circuit to control the phase of oscillation of an output signal generated in said output resonant circuit and make it correspond to the phase of the resultant of an algebraic addition of said three signals, said three control signals corresponding to digital numbers representative of combinations of the variables $x$, $y$, $z$ and $\overline{x}$, $\overline{y}$, and $\overline{z}$, the last mentioned variables being represented by signals opposite in phase to the signals representative of $x$, $y$ and $z$, and the phase of oscillation of said resonant circuit output corresponding to "0" radian and $\pi$ radian corresponding to the "0" condition and the "1" condition of the digital numbers respectively, and cascade connection means for impressing the output signal of each successive borrowing circuit on the adding-subtracting and borrowing circuits of a next successive stage as one of said three input control signals; whereby each stage has an output signal representative of selected values of $x$, $y$, $z$, $\overline{x}$, $\overline{y}$, and $\overline{z}$.

2. In a computing apparatus according to claim 1 in which the control signals applied to the different stages are separate series of pulses applied substantially successively and overlapping partially in time.

3. In a computing apparatus according to claim 1, in which said cascade connection means comprise delay circuit means connected to receive the output of said borrowing circuit and impress it on the adding-subtracting circuit and the borrowing circuit of the next successive stage as one of said control signals.

4. In a computing apparatus according to claim 1, in which said cascade connection means comprise phase shifting means connected to receive the output signal of said borrowing circuit and apply it to said next successive circuit as a control signal.

5. In a computing apparatus according to claim 1, including means for generating two of said three control signals for each stage, said two control signals being signals other than those generated by the borrowing circuits of each stage.

6. In a computing apparatus according to claim 1, in which the output signal of said borrowing circuits is representative of the digital number corresponding to the "Z" input control signal to said successive adding-subtracting circuits and borrowing circuits.

7. In a computing apparatus for performing mathematical operations expressed in the binary system of notation, in combination, a plurality of parallel stages of parametrically excited resonators, each stage comprising an adding-subtracting circuit and a borrowing circuit, the adding-subtracting and borrowing circuit each comprising an output resonant circuit having a predetermined resonance frequency, an exciting circuit coupled to said resonant circuit for parametrically exciting said resonant circuit, means comprising at least one non-linear element for coupling said exciting and output resonant circuits, means for impressing on each of said exciting circuits a frequency of substantially twice said resonance frequency, means receptive of three control signals of substantially equal intensity, said last mentioned means being connected to apply said control signals to said resonant circuit to control the phase of oscillation of an output signal generated in said output resonant circuit and make it correspond to the phase of the resultant of an algebraic addition of said three control signals, said three control signals corresponding to digital numbers representative of combinations of variables $x$, $y$, $z$ and $\overline{x}$, $\overline{y}$, and $\overline{z}$, the last mentioned variables being represented by signals opposite in phase to the signals representative of $x$, $y$ and $z$, and the phase of oscillation of said resonant circuit output corresponding to "0" radian and $\pi$ radian corresponding to the "0" condition and the "1" condition of the digital numbers respectively, and cascade connection means for impressing the output signal of each successive borrowing circuit on the resonant circuits of the next successive adding-subtracting circuit and borrowing circuit of the next successive stage as one of said three input control signals, and each adding-subtracting circuit generating an output signal representative of selected values of $x$, $y$, $z$, $\overline{x}$, $\overline{y}$ and $\overline{z}$.

8. In a computing apparatus according to claim 7, in which said cascade connection means includes phase reversing means for impressing the output signal of said borrowing circuit to the next successive subtractive and borrowing circuit through said phase reversing means.

9. In a computing apparatus according to claim 8, in which said phase reversing means comprise phase reversing transformers.

References Cited in the file of this patent

UNITED STATES PATENTS

| | | |
|---|---|---|
| 2,795,706 | Barker | June 11, 1957 |
| 2,806,151 | Iannone | Sept. 10, 1957 |
| 2,831,929 | Rossi | Apr. 22, 1958 |
| 2,838,687 | Clary | June 10, 1958 |